United States Patent
Krohn et al.

(10) Patent No.: US 12,051,017 B2
(45) Date of Patent: *Jul. 30, 2024

(54) APPARATUS FOR DETERMINING ROLE FITNESS WHILE ELIMINATING UNWANTED BIAS

(71) Applicant: Wynden Stark LLC, Austin, TX (US)

(72) Inventors: Jonathan Krohn, New York, NY (US); Vincent Petaccio, II, New York, NY (US); Andrew Vlahutin, New York, NY (US); Grant Beyleveld, New York, NY (US); Gabriel Rives-Corbett, New York, NY (US); Edward Donner, New York, NY (US)

(73) Assignee: Wynden Stark LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/118,764

(22) Filed: Mar. 8, 2023

(65) Prior Publication Data

US 2023/0222409 A1    Jul. 13, 2023

Related U.S. Application Data

(63) Continuation of application No. 16/945,741, filed on Jul. 31, 2020, now Pat. No. 11,636,411.
(Continued)

(51) Int. Cl.
*G06Q 10/0631*    (2023.01)
*G06F 13/40*    (2006.01)
(Continued)

(52) U.S. Cl.
CPC .. *G06Q 10/063112* (2013.01); *G06F 13/4068* (2013.01); *G06F 40/10* (2020.01);
(Continued)

(58) Field of Classification Search
CPC .. G06Q 10/063112; G06N 20/00; G06N 3/02; G06F 13/4068; G06F 40/10; G06T 1/20; G05B 2219/33029
See application file for complete search history.

(56) References Cited

U.S. PATENT DOCUMENTS

2017/0300565 A1 * 10/2017 Calapodescu ......... G06F 16/353
2020/0257981 A1    8/2020 Chae et al.
(Continued)

OTHER PUBLICATIONS

Krohn et al., "Predicting Job Application Success with Two-Stage, Bayesian Modeling of Features Extracted from Candidate-Role Pairs", JSM 2016—Section on Statistical Learning and Data Science, 2016, pp. 3667-3671.

*Primary Examiner* — Mehmet Yesildag
*Assistant Examiner* — Ayanna Minor
(74) *Attorney, Agent, or Firm* — FisherBroyles, LLP

(57) ABSTRACT

A multicore apparatus determines fitness of a candidate for a role. The apparatus includes a multicore system processing device, a plurality of parallel multicore graphics processing devices, a network interface device, a storage device, and a system interface bus. The network interface device provides remote connection to the multicore system processing device. The storage device stores training data including positive and negative examples. The positive examples represent candidates who would be invited to an interview, and the negative examples represent candidates who would not be invited to an interview. The positive and negative examples are used by the plurality of parallel multicore graphics processing devices to train a deep learning model, which is used by the multicore system processing device to determine fitness of the candidate for the role while eliminating unwanted bias.

20 Claims, 14 Drawing Sheets

Related U.S. Application Data

(60) Provisional application No. 62/885,697, filed on Aug. 12, 2019.

(51) Int. Cl.
| | | |
|---|---|---|
| *G06F 40/10* | (2020.01) | |
| *G06N 3/02* | (2006.01) | |
| *G06N 20/00* | (2019.01) | |
| *G06T 1/20* | (2006.01) | |

(52) U.S. Cl.
CPC ............... *G06N 3/02* (2013.01); *G06N 20/00* (2019.01); *G06T 1/20* (2013.01)

(56) References Cited

U.S. PATENT DOCUMENTS

| | | | |
|---|---|---|---|
| 2020/0293771 A1* | 9/2020 | Lapiello | G06N 3/04 |
| 2020/0311203 A1* | 10/2020 | Zhang | G06F 40/289 |
| 2020/0349392 A1* | 11/2020 | Yehezkel Rohekar | G06V 10/764 |
| 2021/0264373 A1* | 8/2021 | Garg | G06Q 10/1053 |

* cited by examiner

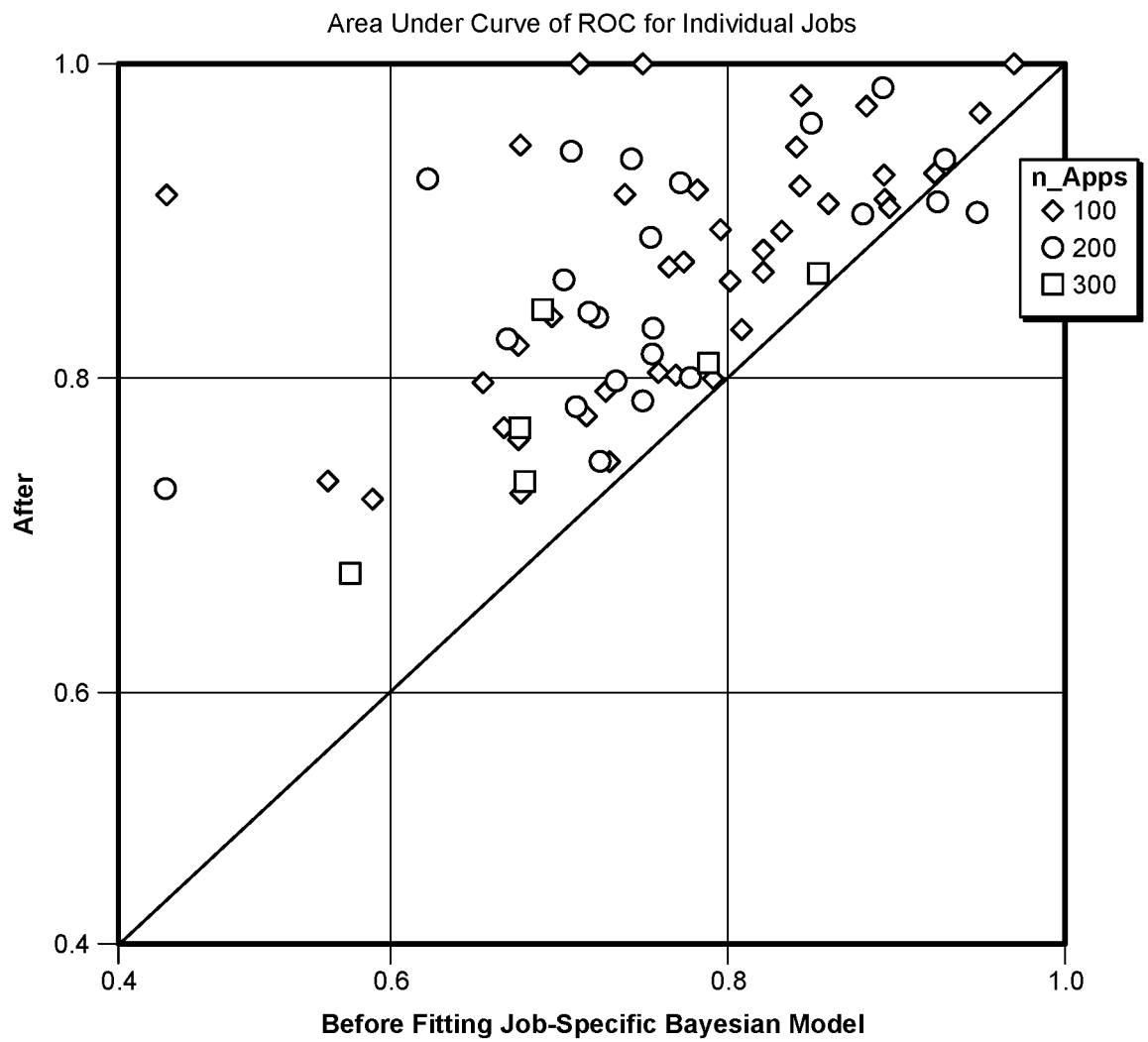

FIG. 12

```
Give me one bullet-point from your resume:
>> * Sat around all day checking my facebook feed
I predict a 0.0% chance of interview Give me one bullet-point from your resume:
>> * Developed trading applications in python
I predict a 24.6% chance of interview Give me one bullet-point from your resume:
>> * Developed python solution for monte Carlo risk calculation using
scipy and pandas, with a Javascript frontend in AngularJS and React
I predict a 98.1% chance of interview
```

FIG. 13

APPARATUS FOR DETERMINING ROLE FITNESS WHILE ELIMINATING UNWANTED BIAS

CROSS-REFERENCE TO RELATED APPLICATIONS

This application is a continuation application of U.S. application Ser. No. 16/945,741, filed Jul. 31, 2020, which claims priority to provisional patent application 62/885,697, filed Aug. 12, 2019, which are incorporated by reference herein in their entireties.

FIELD

The disclosed embodiments generally relate to networks and, more particularly, to an apparatus or system that determines fitness of a given candidate for a given role.

SUMMARY

The disclosed embodiments relate to a multicore apparatus that determines the fitness of a candidate for a role. The apparatus includes a multicore system processing device, a plurality of parallel multicore graphics processing devices, a network interface device, a storage device, and a system interface bus. The network interface device provides remote connection to the multicore system processing device. The storage device stores training data that includes positive examples and negative examples. The positive examples represent candidates who would be invited to an interview, and the negative examples represent candidates without relevant skills and/or experience who would not be invited to an interview. The positive examples and the negative examples are used by the plurality of parallel multicore graphics processing devices to train a deep learning model. The deep learning model is used by the multicore system processing device to predict fitness of the candidate for the role. The system interface bus operably couples the multicore system processing device, plurality of parallel multicore graphics processing devices, network interface device, and storage device.

The fitness may be represented as a value between zero and one, and the value may represent the probability that a human recruiter would invite the candidate to an interview for the role.

The disclosed embodiments also relate to a method of determining the fitness of a candidate for a role. The disclosed embodiments further relate to a computer-readable medium storing instructions that, when executed by a processing device, perform a method of determining the fitness of a candidate for a role.

Other embodiments will become apparent from the following detailed description considered in conjunction with the accompanying drawings. It is to be understood, however, that the drawings are designed as an illustration only and not as a definition of the limits of any of the embodiments.

BRIEF DESCRIPTION OF THE DRAWINGS

The following drawings are provided by way of example only and without limitation, wherein like reference numerals (when used) indicate corresponding elements throughout the several views, and wherein:

FIG. 12 shows the percentage of the area under the curve of the receiver operator characteristic for all jobs with greater than thirty (30) decisions shown before and after role-specific modeling;

FIG. 13 shows user inputs and outputs from an interactive resume bullet-point assessment tool;

It is to be appreciated that elements in the figures are illustrated for simplicity and clarity. Common but well-understood elements that are useful or necessary in a commercially feasible embodiment are not shown in order to facilitate a less hindered view of the illustrated embodiments.

DETAILED DESCRIPTION

Figure 1:
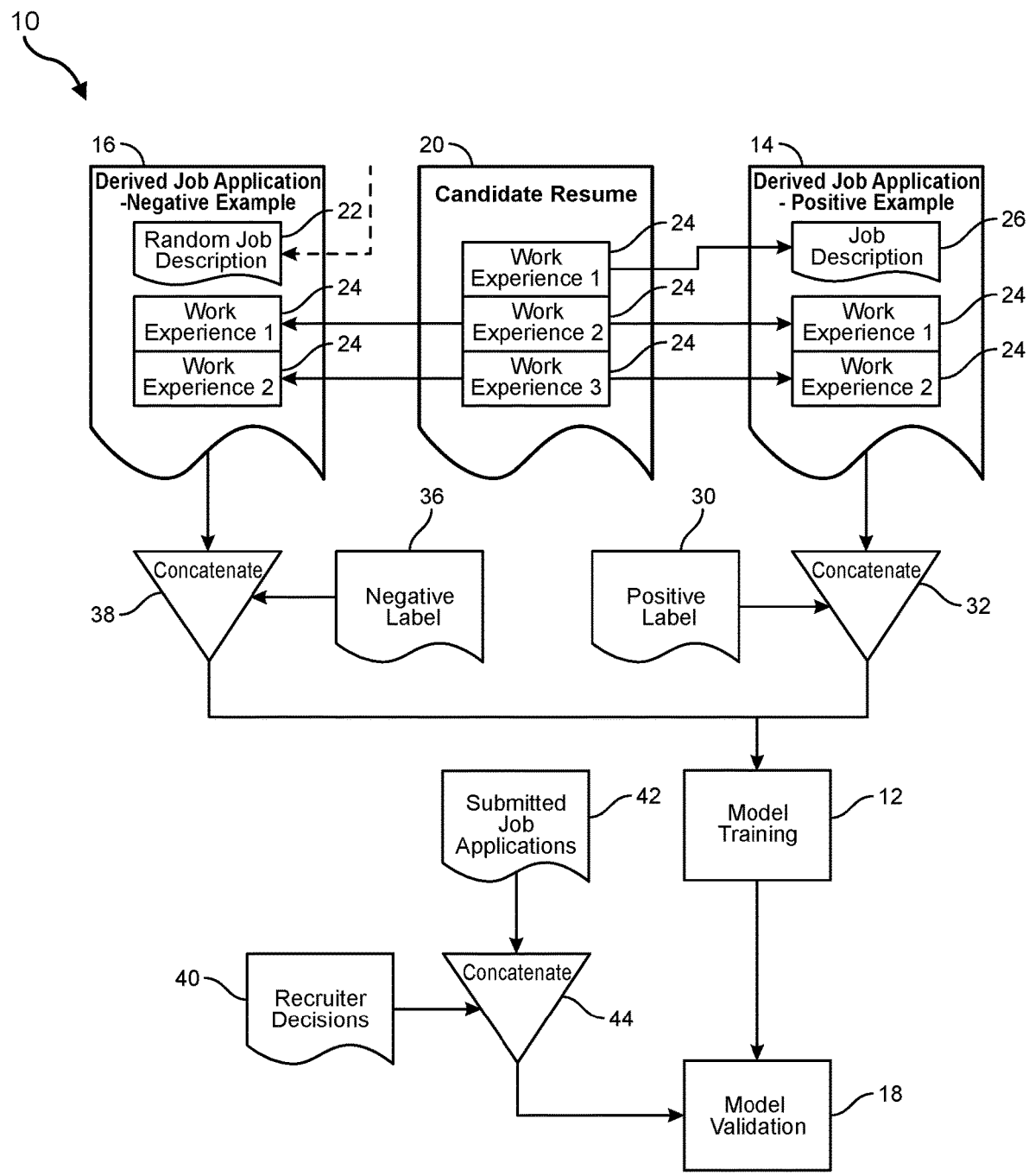
FIG. 1 shows a block diagram that illustrates operation of a system that predicts fitness of a given candidate for a given role in accordance with one or more disclosed embodiments.

FIG. 1 shows a high-level block diagram that illustrates the operation of a system 10 that predicts a fitness of a given candidate for a given role in accordance with one or more embodiments disclosed herein. A deep learning model utilized by the system 10 is trained 12 to predict the fitness of any given candidate for any given role. Fitness is defined and expressed herein as a score between zero and one, and is interpreted as the probability that a human recruiter would invite the candidate to an interview for the role. In order to train 12 the deep learning model to score candidates, a set of training data with both positive examples 14, which are defined herein as high-quality candidates who would be invited to an interview, and negative examples 16, which are defined herein as candidates without relevant skills and/or experience who would not be invited to an interview, are used. Through repeated consideration and analysis of each of these examples, the model learns to identify those traits that differentiate suitable candidates from unsuitable applicants. In addition, a set of data is used to ensure that the model learns an accurate mapping of job applications to predicted scores to ensure that the scoring process is valid 18 for new, unseen candidates and job descriptions.

Figure 7:
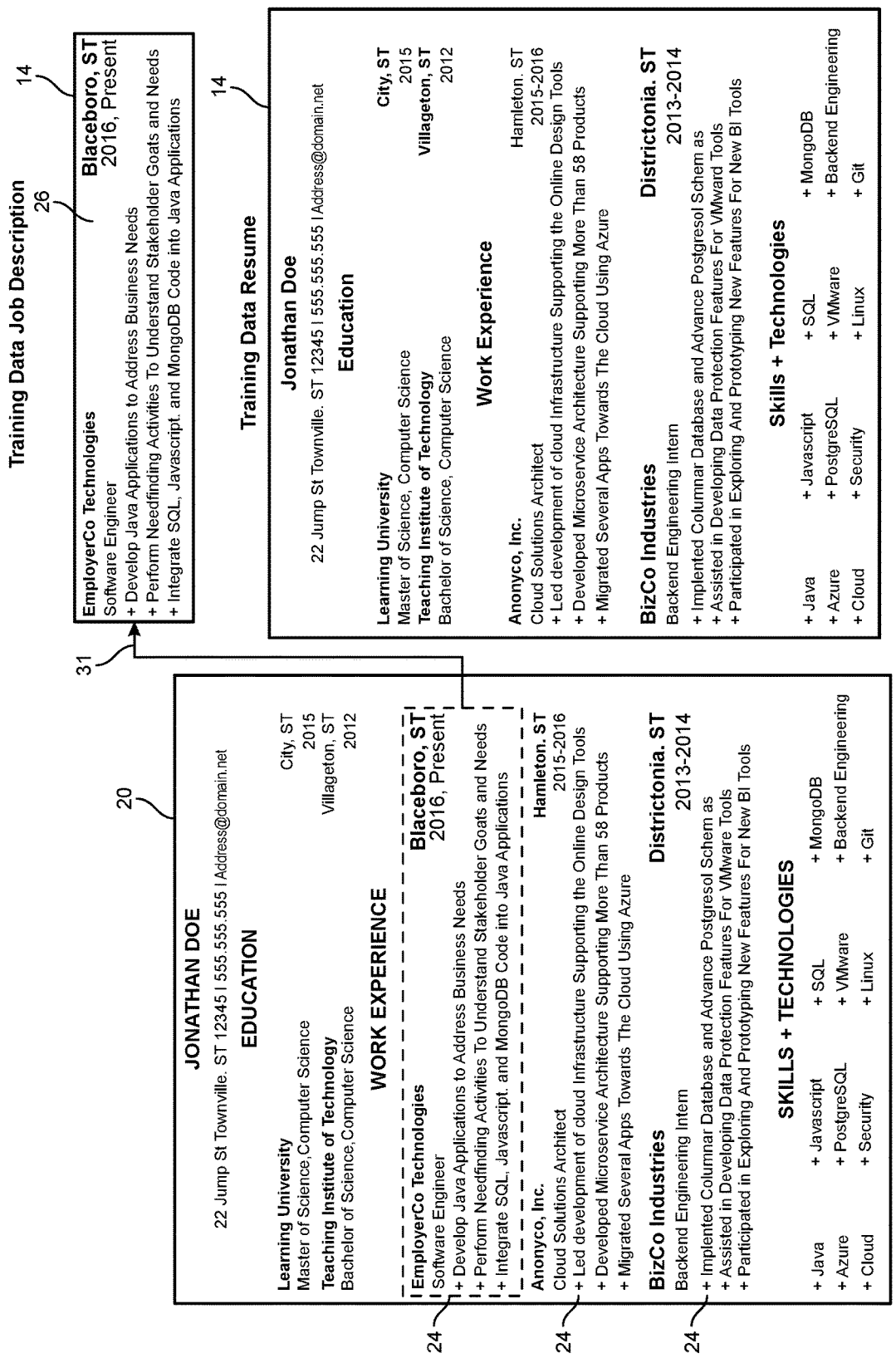
FIG. 7 shows a diagram illustrating the generation of positive training data examples.

To generate this set of data, candidate resumes 20 are collected and processed to create derived job applications for the positive and negative examples 14, 16. For candidates with three or more roles or work experience 24 listed in their professional history, the most recent role is stripped 31 from the resume 20. This role or work experience 24 is then considered as a job description 26, for which the candidate's remaining work history represents a high-quality candidate. The combination or concatenation 32 of this derived job description 26 and the preceding work experience 24 are labeled positive 30 and concatenated 32 to the training data 12 as a positive example 14, as illustrated in greater detail in FIG. 7.

Figure 8:
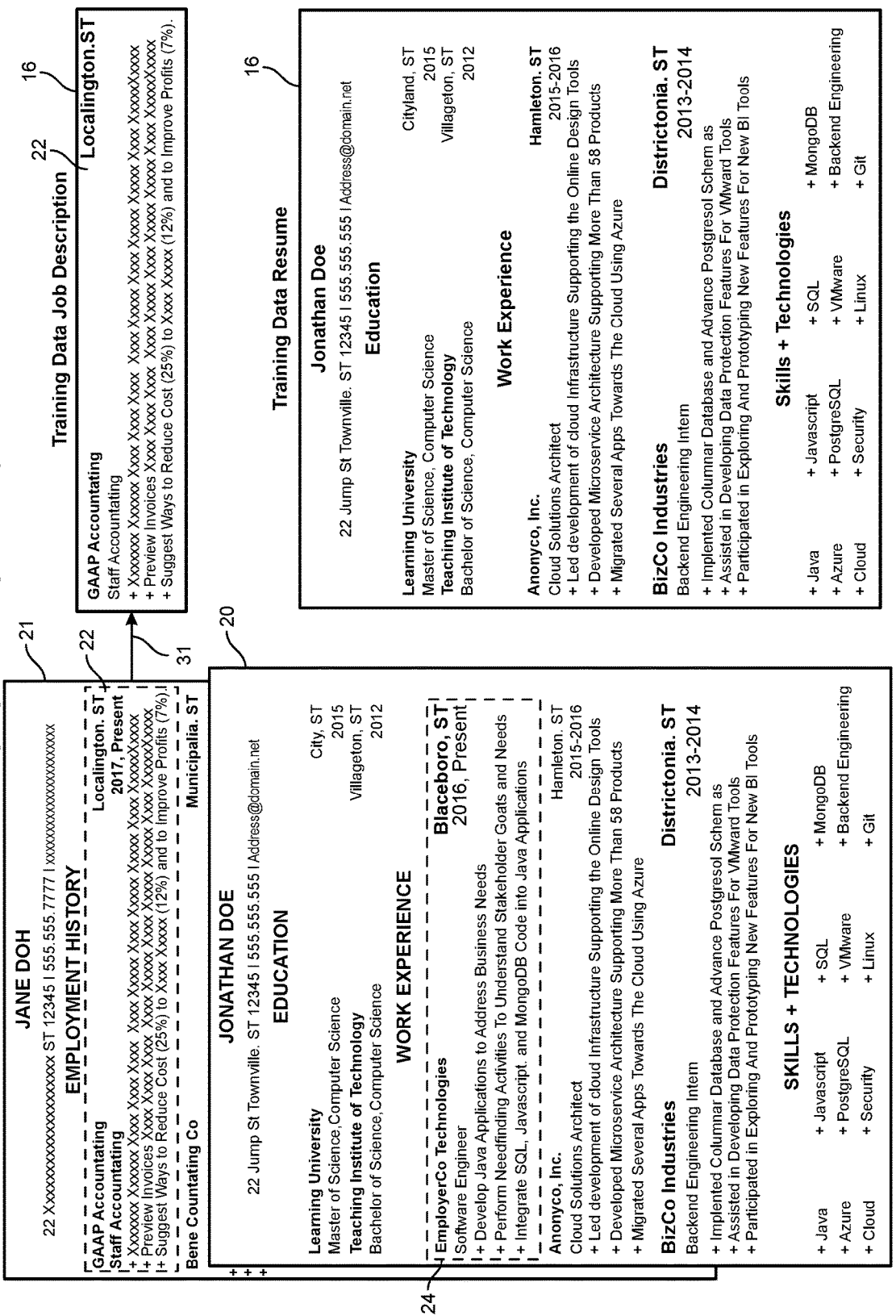
FIG. 8 shows a diagram illustrating the generation of negative training data examples.

To create negative examples 16, the most recent work experience 24 is again stripped 31 from the resume 20, and a random job description 22 from a randomly selected, different resume 21 is substituted. Since it is unlikely that the candidate will be a good match for the arbitrary, random role or job description 22, the combination or concatenation 38 of the candidate's past work history and this random job description 22 is labeled negative 36 and added to the training data as a negative example 16, as illustrated in greater detail in FIG. 8.

With the set of training data 12 including both positive examples 14 and negative examples 16, the model is trained with training data 12 through repeated exposure to this set of data. To ensure that the mapping from job applications (i.e., a job description and a candidate's resume) to a fitness score is learned appropriately, the model is validated 18 using previously unseen actual recruiter decisions 40 regarding actual job descriptions, submitted job applications, and resumes 42. This concatenation 44 serves to validate or confirm 18 that the model approximates actual human decision making.

By training 12 the model on a diverse set of generated training data, and then validating 18 the model on previously unseen actual recruiter decisions, the model benefits from a broad training set, with performance of the model confirmed by comparing the model against actual human decisions.

Figure 2:
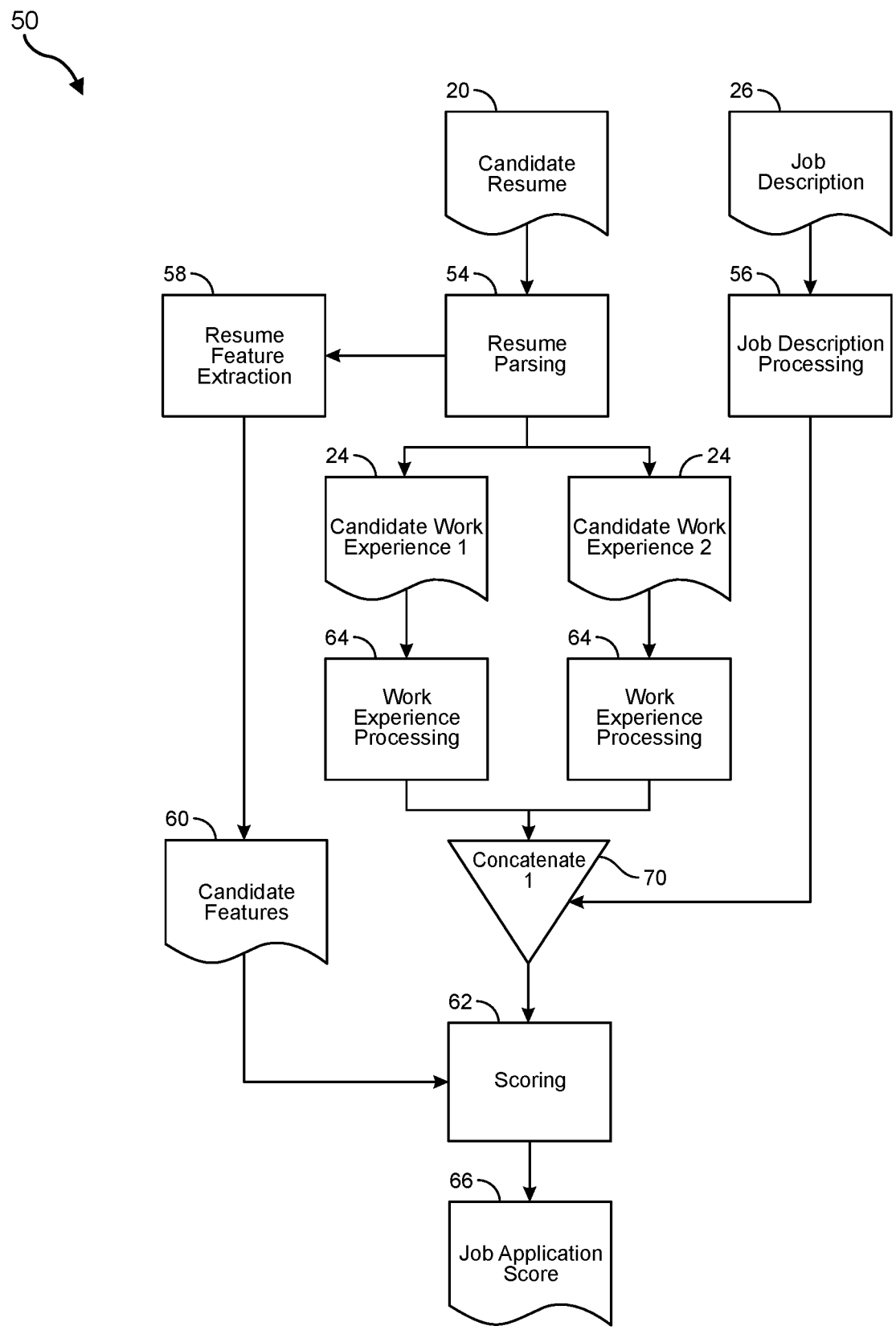
FIG. 2 shows a block diagram that illustrates a scoring process performed by the system.

FIG. 2 shows a high-level block diagram that illustrates a scoring process 50 performed by the system in accordance with one or more disclosed embodiments. The scoring process 50 applied by the deep learning model utilizes parallel processing of the candidate's two most recent work experiences 24, as well as the job description 26. This is accomplished by first parsing 54 the candidate's resume 20 and extracting relevant information-rich natural language, excluding words of limited utility such as "THE", "AN", "IF", and the like. Demographic and personal information such as name, gender, and date of birth are excluded from the extracted language and are not considered during the modeling process. This natural language is separated by work experience, and each of the two most recent work experiences 24 is processed 64 by a natural language model of identical architecture running in parallel. Separately, the job description 26 is also processed 56 using a natural language model of identical architecture.

In order to limit the capacity for the model to develop explicit biases against any particular demographic group (e.g., a particular gender or race), in addition to excluding demographic and personal information (including name, gender, age, race, geographic location, first language, and country of citizenship) from the extracted resume, any indicative pronouns (e.g., "she", "he", "her", "his") are also excluded.

Alongside taking steps to prevent the development of explicit biases against any particular group, measures are implemented to ensure that implicit biases are also not developed. For example, although no personal information is provided to the model (thereby limiting its capacity to develop an explicit bias), it may be the case that in certain circumstances the writing style of applicants who are women applying to a particular type of role varies systematically from the writing style of applicants who are men. In such a circumstance, writing style correlates with gender, and so it would theoretically be possible for the model to be biased against applicants of one gender or another. To assess this possibility, we use topic modeling to examine the topics (collections of related words) that drive the model's predictions to confirm that the topics contributing to the model's output do not relate to any particular demographic group (e.g., gender or race).

In order to confirm that measures to limit both implicit and explicit bias are effective, a formal statistical test is run. Scoring a dataset of 200 candidates to each of 537 unique roles, 100 of whom have a given name typically associated with women and 100 of whom have a given name typically associated with men, the average fitness of the candidates for the roles does not vary significantly by gender (according to Student's t-test, the probability of observing the difference between means by chance alone is greater than 0.05, the standard threshold of statistical significance). Similarly, scoring a dataset of 400 candidates to each of 537 unique roles (100 Asian, 100 Hispanic, 100 non-Hispanic Black, and 100 non-Hispanic White, as predicted by first and last name using a demographic model trained on U.S. census data) the average fitness of the candidates does not vary significantly by ethnicity (according to the same Student's t-test approach as in the gender comparison).

The resume parsing 54, and the work experience processing 64 begin with the filtered language (i.e., the original language stripped of common words as noted above) and then transforms the words into numeric values. These values are represented as vectors, each with, for example, 64 values, which encode the meaning of the words such that the model understands relationships between adjacent words. The model then analyzes the series of vectors to infer meaning and content from the language of each work experience sample and from the job description.

Separately, the candidate's resume is parsed 54 to identify a presence or absence of each of a set of employment and experience-related keywords. These features are then collected and processed by resume extraction feature 58 alongside the results of the three parallel natural language models. The candidate features 60 consider such properties as duration of total work history, education level, education concentration, skills listed in a resume, and the like. The model then returns a job application score 66 through scoring 62, which is generated by considering these inputs 60 and 70.

Figure 3:
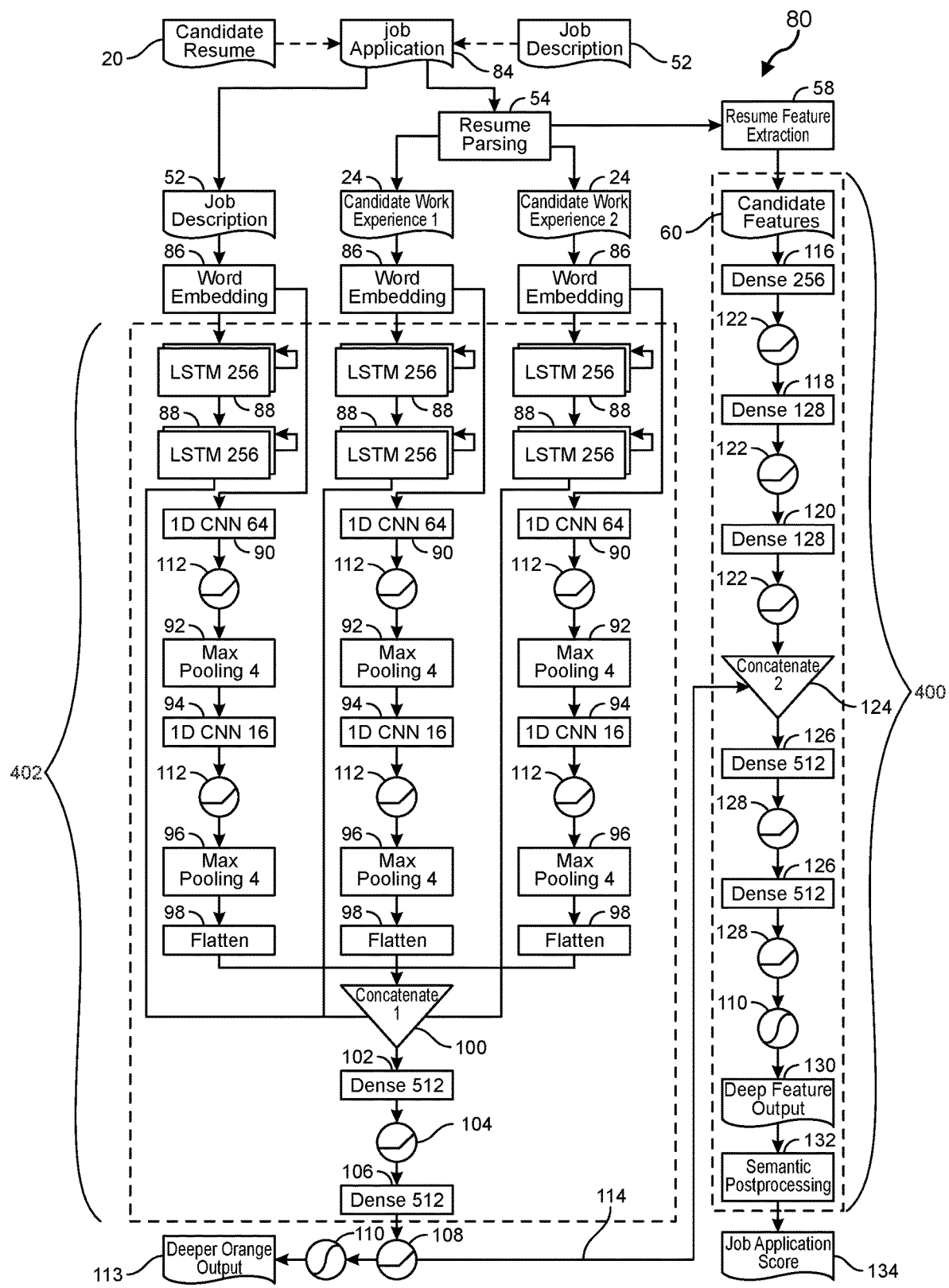
FIG. 3 shows a detailed block diagram illustrating the scoring process performed by the system.

FIG. 3 shows a more detailed block diagram that illustrates the scoring process 80 performed by the system in accordance with one or more disclosed embodiments. A specific model architecture is implemented as shown. Three (3) parallel deep learning natural language model paths and subsequent post-processing steps are shown, as initially illustrated in FIG. 2. Sigmoid output neurons 110 are shown at the output stage of each portion of the model, with rectified linear unit (ReLU) neurons 112 used between internal layers within the model.

A job application 84 includes a candidate's resume 20 and the description of the job 52 for which the candidate is applying. The parsed 54 resume language and the job description 52 are each tokenized, converted into an integer (based on an index of integers for each unique token), and processed by a word embedding model 86 that yields a meaningful high-dimension representation of the language data. This information is passed to two long short-term memory (LSTM) cells 88 in series, each with 256 hidden units or nodes. In parallel, the information is passed to a one-dimensional convolutional neural network (CNN) 90 with 64 filters, followed by a max pooling layer 92 and a second one-dimensional CNN 94 with 16 filters and a final max pooling layer 96. The output is then flattened 98 into a one-dimensional vector.

The outputs of each of these two parallel model pathways for each of the three sets of information are concatenated 100 into a single vector, which is then passed to a 512-unit dense neural network layer 102 followed by a ReLU activation 104 and a second 512-unit layer 106 with its own ReLU activation 108. To generate a "deeper orange" score output 113, the output of this ReLU unit 108 is passed through a sigmoid activation neuron 110 to ensure that outputs appropriately model a probability. However, the pre-sigmoid output of the deeper orange model component is employed in downstream processing 114.

Figure 10:
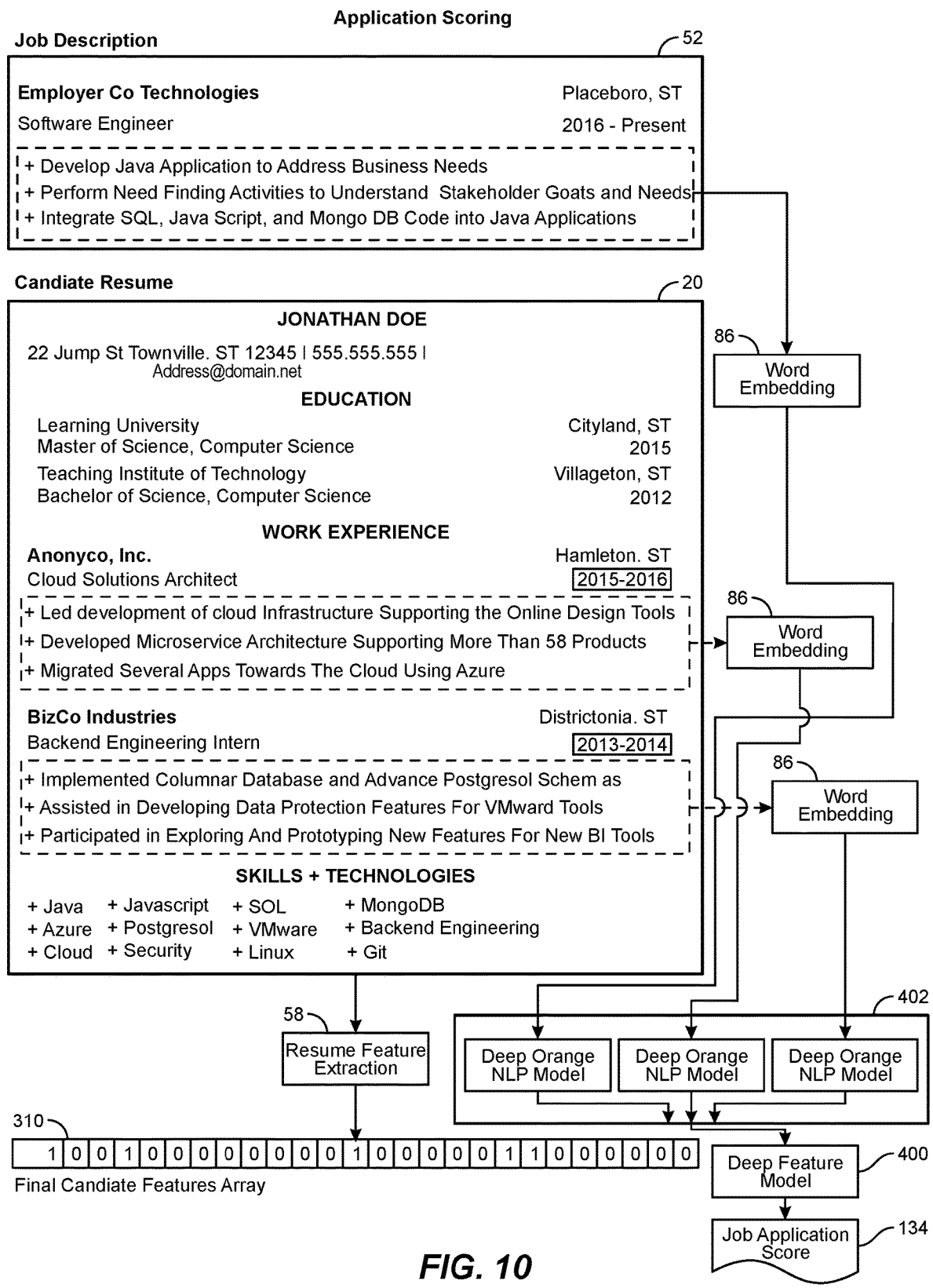
FIG. 10 shows a diagram illustrating application scoring.

When the candidate's resume 20 is parsed, numeric features are derived by the resume feature extraction 58. Candidate features 60 are passed to a three-layer dense neural network 116, 118, 120 with layer sizes of 256 units in the first layer 116 and 128 units in each of the second layer 118 and third layer 120. Each layer utilizes a ReLU activation 122 therebetween. The output of the third layer is concatenated 124 with the pre-sigmoid deeper orange output 114 and passed through two consecutive 512-unit dense network layers 126, each with a ReLU activation 128, and finally to a sigmoid activation 110 to produce a final, so-called "deep feature" output score 130 between zero and one. Semantic post-processing 132, which precedes the final job application score output, involves heuristic adjustments to score components secondary to the values of particular features, as generated by the deep feature output score 130 and other feature extraction processes. This semantic post-processing 132 enables rapid adjustment of scores through the injection of domain knowledge into domain-specific models, which then results in a job application score 134 output. FIG. 10 illustrates operation of the scoring process with respect to a specific example as a higher-level depiction of the concepts shown in FIG. 3. FIG. 10 also further shows a set 402 of three instances of a deep orange NLP model, as well as a deep feature model 400.

Figure 4:
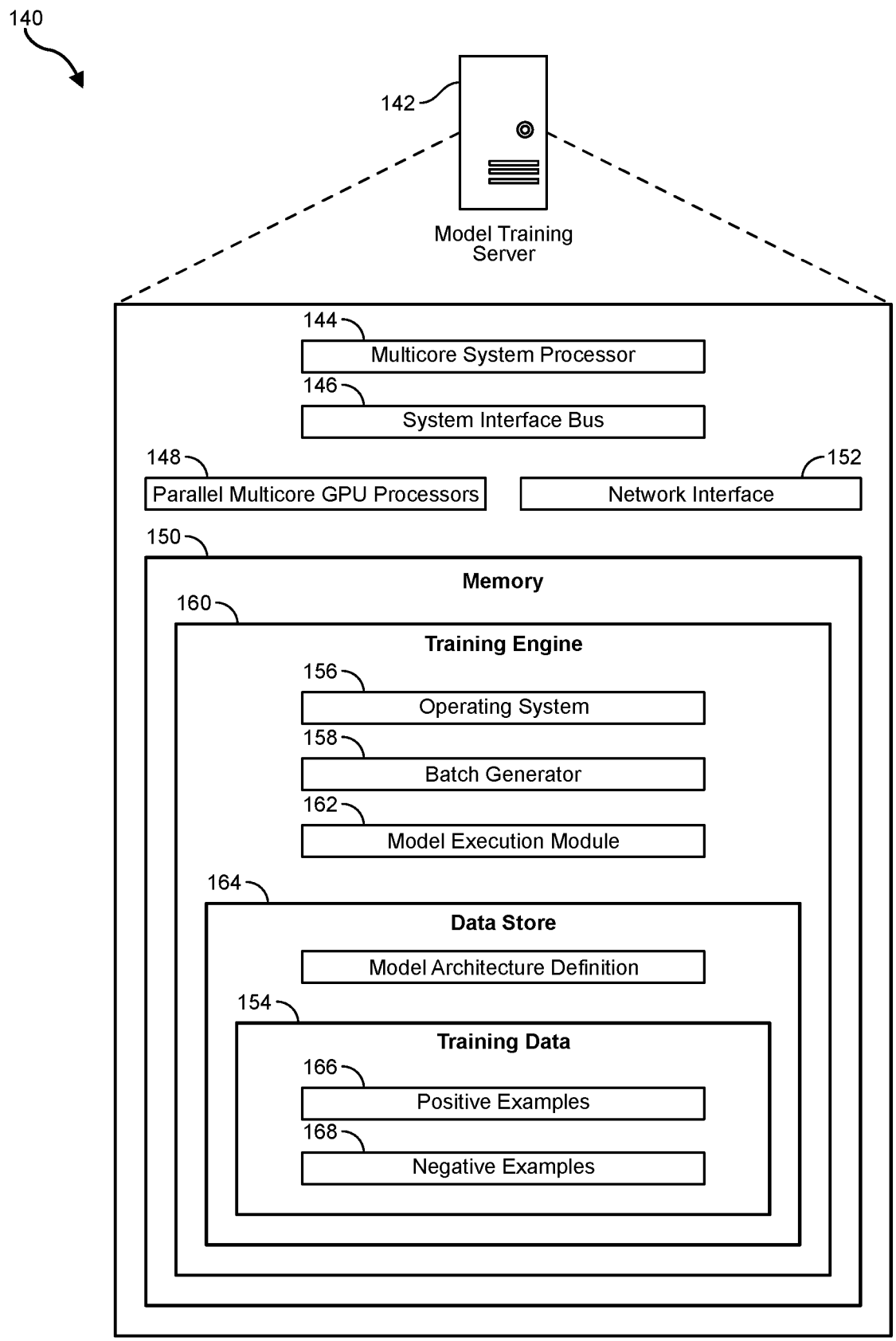
FIG. 4 shows a hardware block diagram of the system that predicts fitness of a given candidate for a given role.

FIG. 4 shows a block diagram 140 of an example system that predicts a fitness of a given candidate for a given role. A model training server 142 includes a computing machine combining a highly specialized hardware configuration with custom software to enable a high-performance model refinement process. The combination of this hardware with the custom software yields a special-purpose-built machine as one component of this example. The hardware configuration includes a multicore system processor 144, which is implemented using an i7-6850K available from INTEL® Corporation that is capable of supporting twelve (12) total system threads. Data is communicated systemwide using a system interface bus 146, which supports communication among physical system components, including the multicore system processor 144, specialized parallel multicore GPU processing units 148, system memory 150, network interface 152, and the like.

In addition to the multicore system processor 144, two (2) specialized, highly parallel graphics processing units 148, which are implemented using GeForce® GTX 1080 Ti GPUs available from NVIDIA Corporation, are configured for use as matrix operation processors. Each of these GPUs 148 uses 3,584 specialized processing cores to enable massively parallel computation, thereby substantially accelerating the millions of linear algebraical operations required when training the deep learning model described herein.

Figure 5:
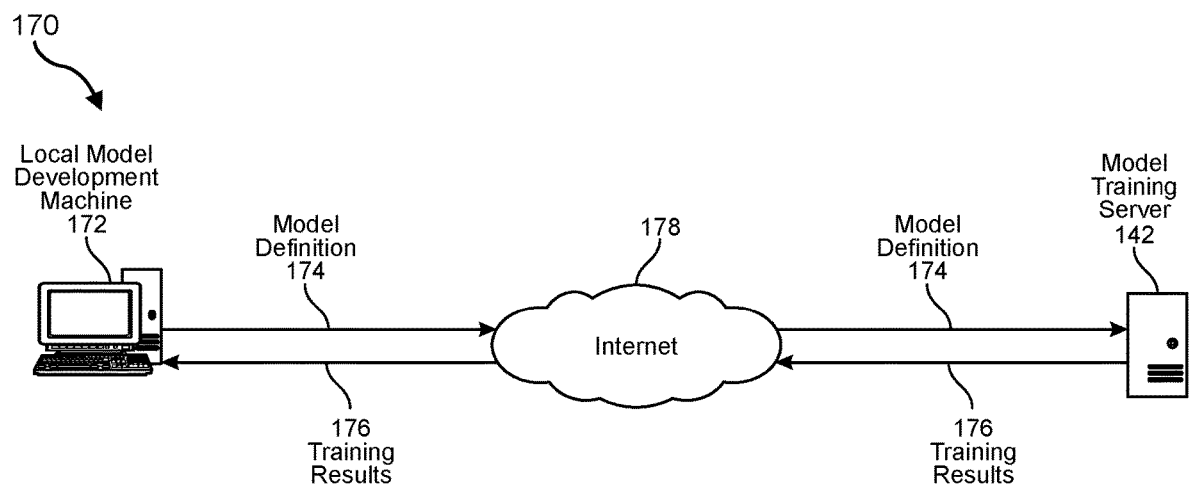
FIG. 5 shows a block diagram of a network system including the system that predicts fitness of a given candidate for a given role and a local model development machine.

The network interface 152 enables remote connections to be formed, and new model architecture definitions to be transferred to the model training server 142 for training. This process is shown in FIG. 5. In addition, the network interface 152 enables data transfer to the model training server 142 to provide rapid access to in-memory training data 154.

Within the system memory 150, an operating system 156, which is implemented using the Ubuntu operating system in at least one of the disclosed embodiments, coordinates system operation and allows access to system resources. A batch generator 158 provides a set of instructions that collect training data and combine the training data into discrete packages, each of which is used for model training by a training engine 160. This batching process ensures that the specialized training hardware is optimally leveraged. A model execution module 162 includes an instruction set used for training and updating the model. The model architecture definition undergoing training is stored in a data store 164 along with the training data 154, which is generated as described with respect to FIG. 3, and includes positive examples 166 and negative examples 168.

FIG. 5 shows a block diagram 170 of the operability of an example system that predicts the fitness of a given candidate for a given role with a local model development machine 172. Since a development team shares computing resources, and as remote development on powerful specialized computing hardware enables efficient processing as shown in FIG. 4, the model training server 142 is configured to accept authorized incoming connections and instructions using its network interface 152 coupled to the Internet 178. Using this capability, a model definition 174 is uploaded to the model training server 142 from any remote location using the Internet 178, and the training process is initiated. Thereafter, training results 176 are downloaded from the model training server 142 to the local model development machine 172 using the Internet 178 for use in downstream process development work.

Figure 6:
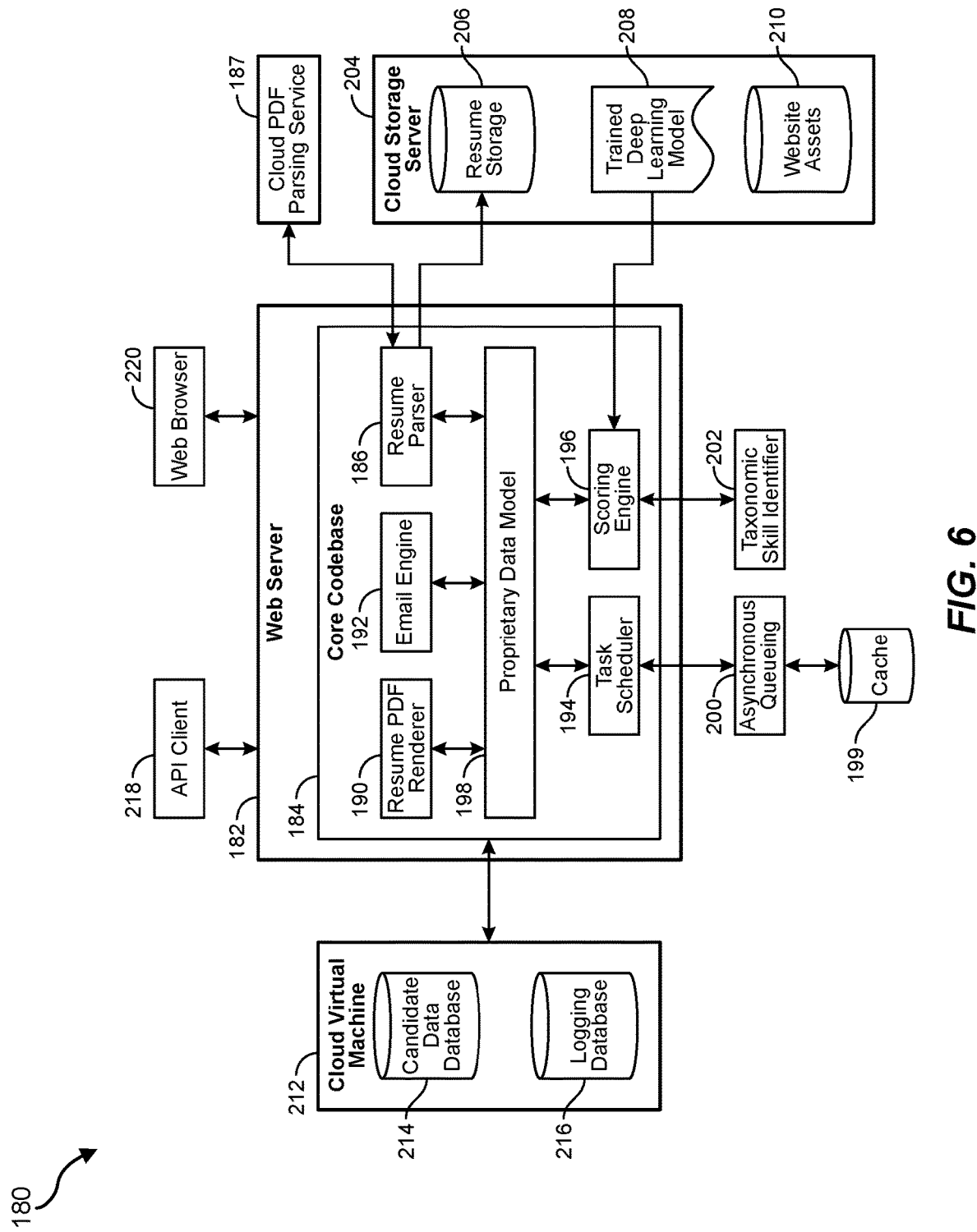
FIG. 6 shows a block diagram illustrating deployment of the model using a web server.

FIG. 6 shows a block diagram 180 illustrating deployment of the model using a web server 182. After training the deep learning model used to determine a candidate's fitness for a given job, the model is deployed on the web server 182, with which the model is used in conjunction with an online job marketplace wherein candidates submit their resumes to be scored by the model for roles posted by employers. The system is realized with a particular hardware and software configuration implemented on a web server.

The web server stores a core codebase 184, which includes instructions that parse 186 and render 190 candidate resumes, an email engine 192 that composes and sends email messages to users and administrators, a task scheduler 194, and a scoring engine 196 that applies the deep learning model to submitted resumes and associated job descriptions. Resume parser 186 may also interact with a cloud PDF parsing service 187. The web server 182 also includes a definition of a proprietary data model 199 that defines formats of and valid operations on the data used in the application. In separate machines are instances of a database 198 of cached data, which enables higher performance when paired with a queueing tool 200 to manage scheduled tasks, and a taxonomic skill identifier 202 that aids the model scoring engine 196 in identifying natural-language skills within submitted resumes.

On a separate cloud storage server 204, the candidates' submitted resumes are securely stored in resume storage 206 for future parsing and processing, along with the trained deep learning model 208, which is employed by the scoring engine 196 and standard website assets 210 used on the marketplace website. Another cloud virtual machine 212, running on a separate hardware server accessed via the Internet, includes the parsed candidate data database 214 as applied by the proprietary data model 198, as well as a logging database 216 including logs and records of application activity.

The web server 182 is accessed and queried using either calls from authorized application programming interface (API) clients 218, or by direct access using a web browser 220.

The deep learning model development process used in this example system follows a path of increasing model complexity, with at least one embodiment representing the best of a wide variety of architectures. The availability of increasingly larger datasets, fostered by the deployment of earlier models, enables the training and development of more highly parameterized models.

One embodiment is a heuristic model that utilizes manually generated rules for sorting and scoring resumes. This embodiment includes an analysis of elements of the candidate's resume alone, such as years of work experience, education level, area of concentration, and seniority, as well as measures of similarity between the job description and the resume. This model was tested and validated using an entire set of available data.

Another embodiment is a logistic regression model built around the same set of heuristic features. Approximately 1,000 resumes and hiring decisions were used to train the model, which provides efficient performance. This model was restricted to industries for which relevant heuristic features, such as quality of educational institutions, relevance of particular traits, and the like, were known and could be encoded.

A richer set of features that characterize the fitness of a given candidate for a given role were then developed. This effort yielded more subtle features, such as years of relevant technical experience (as opposed to years of professional experience) and a technique that represents seniority levels in a continuous, rather than discrete, manner.

With these additional features powering the logistic regression model, models capable of learning and modeling the unique and individual hiring preferences of particular hiring managers and recruitment firms were developed. To enable this fine-tuning, the model was trained on all available generic data, followed by additional training performed using a given client's decision data. Model weights from the generalized model were assigned a range within which the model weights were allowed to vary during this second training stage. This made it possible to restrict critical features to pre-trained values, while features encoding individual client preferences could vary within a wider range. This process provides effective models that represent preferences and idiosyncrasies of individual firms.

Efforts to improve on this latter model led to the creation of an additional model component, which includes a neural network that processes values of the heuristic features and returns a score. The output of this model is linearly combined with the output of the logistic regression model to yield an ensemble model combining and building upon the performance of both model components.

The ensemble model enables additional gains using powerful deep learning model components. Further development efforts yielded a recurrent neural network architecture using long short-term memory (LSTM) network cells. The recurrent neural network architecture is expanded by adding one-dimensional convolutional layers to apply a spatial search over the input text. This combined recurrent-convolutional model architecture is then forked into three identical, parallel model pathways, one for each of the candidate's two most recent employment summaries, and one for the job description. These parallel model pathways' outputs are then combined to form a single model. This is the "deeper orange" model that forms the primary natural language processing (NLP) component of the model in at least one of the disclosed embodiments.

Another component is the "deep feature" network, which is appended to the deeper orange model. The deep feature network resembles the first neural network ensembled with the logistic regression model in that the deep feature network takes the heuristic features as inputs, though the deep feature network differs in that the output of the final layers of the deeper orange model is also an input to the deep feature network. The deep feature output is passed through additional heuristic adjustments in the semantic model.

Figure 9:
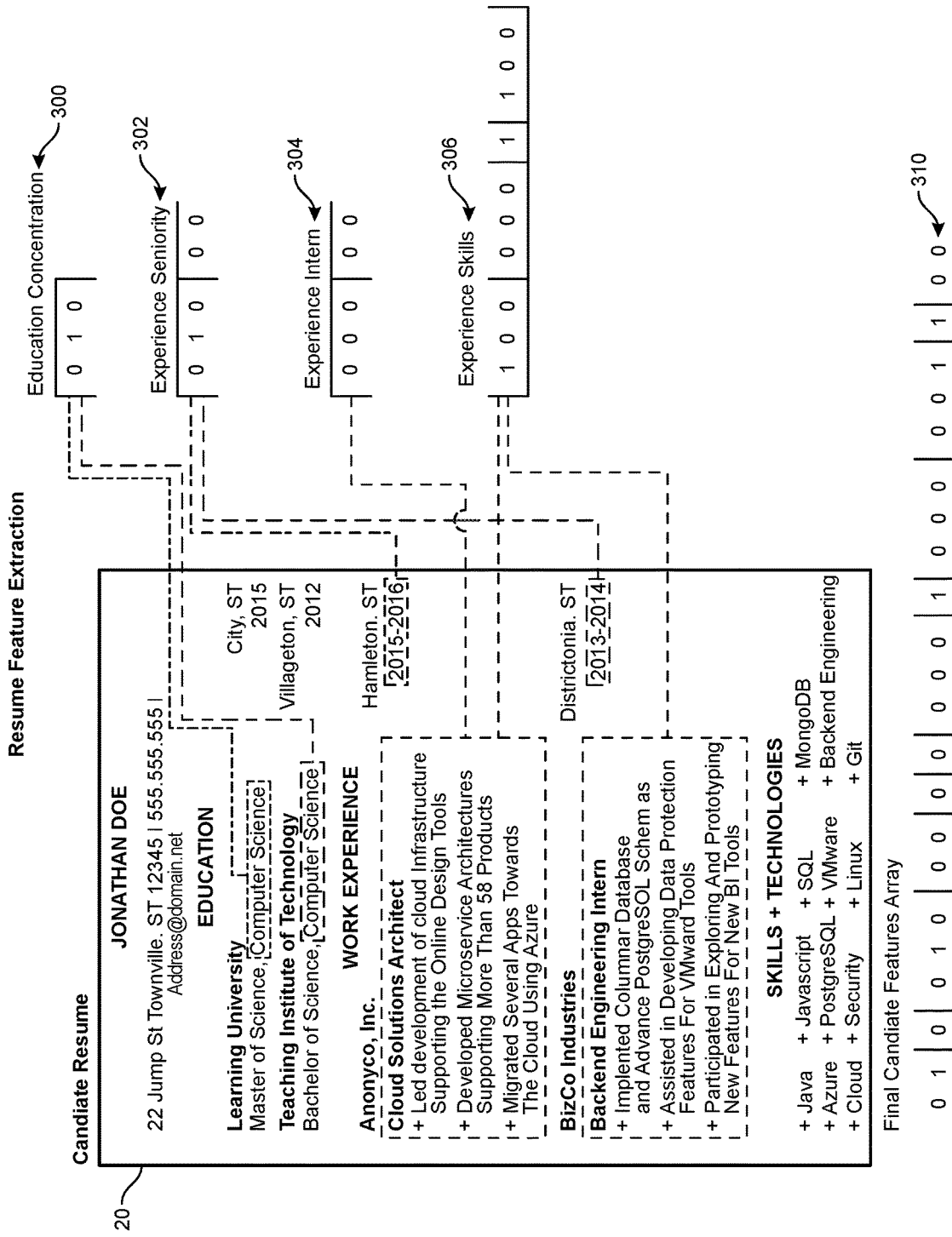
FIG. 9 shows a diagram illustrating resume feature extraction.

As illustrated in FIG. 9, features passed into the deep feature network include education concentration 300, experience seniority 302, experience intern 304, and experience skills 306, which can be processed to generate a final candidate features array 310.

To determine a candidate's education concentration 300, the area of study for each instance of educational experience is extracted from the candidate's resume 20 as raw text. These extracted concentration strings are then compared against a predefined list of concentration areas. If there is a match for any given predefined concentration, then the candidate receives a one for that concentration and, if not, the candidate receives a zero. This group of zeros and ones is then used as the education concentration feature 300.

For the experience seniority feature 302, each role in a candidate's professional experience is checked against a static and predetermined group of relevant and important terms extracted from job descriptions. If relevant terms are present, then the time spent in the role is considered relevant experience. The total relevant experience is computed by summing the experience across all relevant roles, and that sum is then placed into one or more of the following categories: 0-1 years; 1-3 years; 3-7 years; 7-15 years; and 15+ years. Some overlap between these bins is implemented using fuzzification, which enables a given candidate to be assigned partially to two different categories. For example, if a candidate has 3 years of experience, it is considered that that candidate is assigned to the 1-3 years group with a weighting of 0.5 as well as to the 3-7 years group with a weighting of 0.5.

To compute the experience intern feature 304, the most recent work experience within the candidate's professional history is extracted and compared against a pre-compiled list of keywords, which suggest that the role is an internship, co-op, or similar position. Presence of each particular keyword is indicated with a one in the feature group, and absence of each particular keyword is indicated with a zero in the feature group.

The candidate's experience skills feature 306 is an important factor in determining fitness for a given role. To determine which relevant skills are offered by the candidate, the descriptions for each role in the candidate's employment history are grouped together and then compared against a pre-defined group of relevant skill terms. As with the features described above, the presence or absence of given skills is represented with a one or a zero, respectively.

In summary, a two-stage model identifies the best-suited candidates for a given role, which (1) learns hiring manager preferences for the role; (2) can be updated frequently, with low latency; and (3) scales to a very large number of roles. In the first stage, a plurality of candidate-role features is modeled in a regression across all applications and roles. The feature weights are subsequently fed as priors into n individual Bayesian models representing n roles. Cross-validated results indicate this approach improves classification accuracy, with an area under the curve of the receiver operating characteristic improving from 71.8% to 77.0%.

As an exemplary implementation, a digital platform matches, for example, software engineers with personalized suggestions for full-time roles in the technology sector. Using a hosted web application, candidates provide job search-relevant questionnaire responses (e.g., geographical location) and descriptions of their work experience, level of expertise with relevant skills, and educational background.

A statistical model is generated that identifies, for example, the best-suited engineers from a pool of candidates for roles posted by clients. As a first criterion, the model learns preferences of the hiring manager for a given role. As a second criterion, the model is updated frequently, such as at least daily, to incorporate recent manager decisions. Third, the model is scalable to any number of roles.

Job-specific feature weights (posterior means) are theoretically estimated with PyMC3, which is written in Python, an interpreted, high-level, general-purpose programming language package, for Bayesian statistical modeling and probabilistic machine learning that focuses on advanced Markov chain Monte Carlo and variational fitting algorithms (Salvatier, J., Wiecki, T. V., and Fonnesbeck, C., *Probabilistic Programming in Python Using PyMC3*, PeerJ Computer Science, 2, e55 (2016)) or Stan, which is a probabilistic programming language for statistical inference written in C++ (Carpenter, B., Gelman, A., Hoffman, M. et al., *Stan: A probabilistic Programming Language*, Journal of Statistical Software) using No U-Turn Sampling (NUTS) (Hoffman, M. and Gelman, A., *The No-U-Turn Sampler: Adaptively Setting Path Lengths in Hamiltonian Monte Carlo*, Journal of Machine Learning Research, 15, 1351-1381 (2014)). In practice, however, such a hierarchical model with dozens of features and merely hundreds of roles, which would preferably be an unlimited quantity of roles, would be computationally excessive, and thus expensive. To overcome these limitations, a methodology that separates modeling into two stages, as represented by the following equation, is used.

$$p = \frac{1}{1 + e^{-(\beta_0 + \beta_1 x_{1,i} + \beta_m x_{m,i})}} \quad (1)$$

The methodology begins by fitting an Elastic Net-regularized logistic regression model across the applications and roles. The features ($x_{1,i}$ through $x_{m,i}$) engineered from each candidate-role pair i includes structured application data, such as whether the candidate's years of relevant technical experience approximate requirements of the job description; unstructured application data, such as abstractions of the natural language used within a candidate's work experience entries; clusters of related technical skills; and within-platform behavior.

Figure 11:
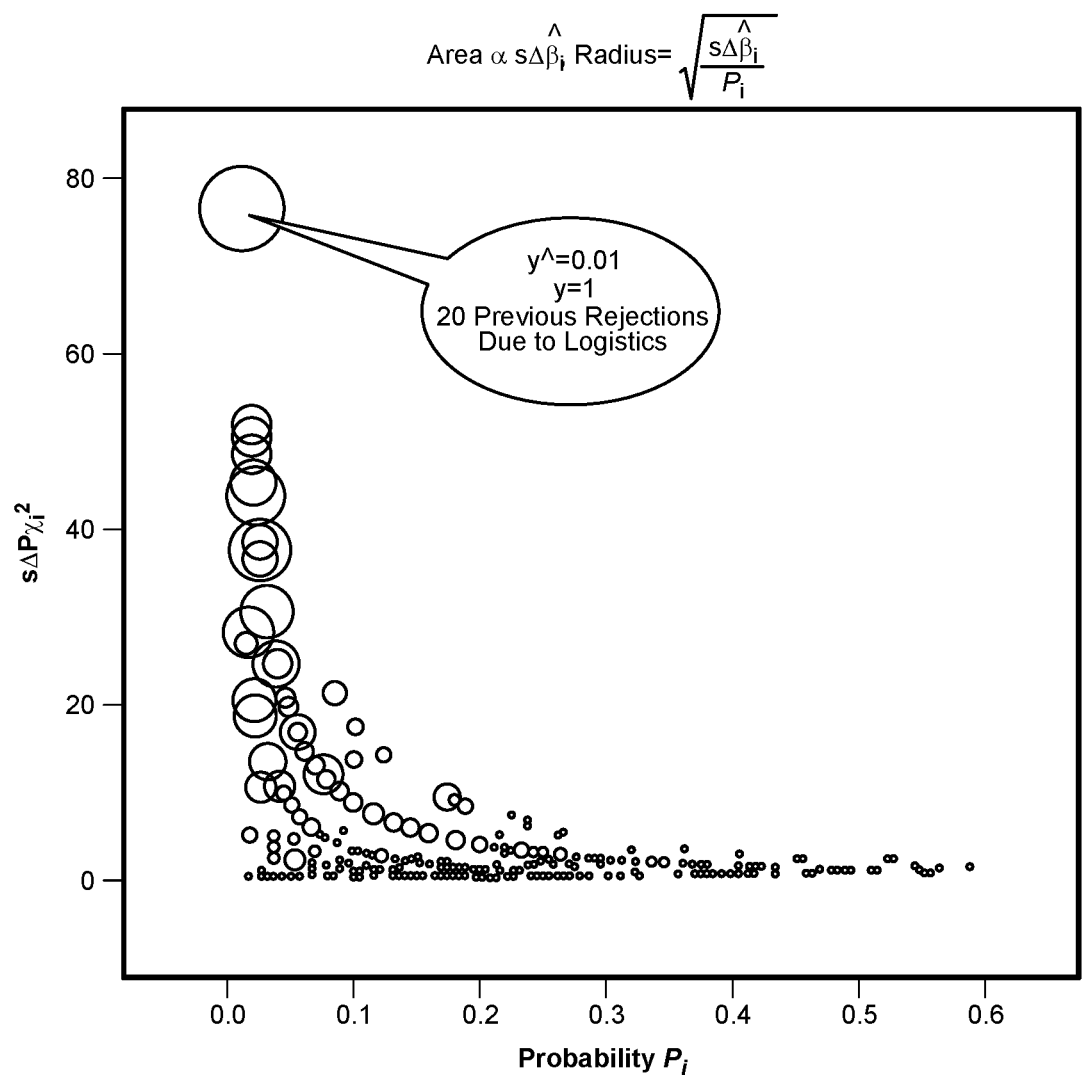
FIG. 11 shows a chart illustrating residual analysis.

While developing this general model, residual analysis, as shown in FIG. 11, plays a key role in identifying over-leveraged cases and adjusting feature generation accordingly. In one example, the model predicts a low probability (i.e., 0.01) of invitation to interview based on the candidate being rejected due to logistics (a rejection reason that is unrelated to the candidate's fitness for the role) on twenty (20) prior occasions. An effective, leverage-attenuating resolution mitigates this feature.

To learn hiring manager preferences for n individual roles, general feature weights are passed through $\beta_1$ to $\beta_m$ from equation (4) as prior means to n individual Bayesian models. The No U-Turn Markov chain Monte Carlo approach (Hoffman & Gelman, 2014) is used to sample. Domain-specific knowledge is leveraged to assign narrow prior variance to some features and wider variance to others.

Among other downstream uses across the platform, $p_i$ for each candidate-role pair i determines which applications to forward to hiring managers, who get real-time feedback on their candidates and their own in-platform behavior.

Using k=5 cross-validation, the Bayesian model described above demonstrably improves classification accuracy over the general model as assessed, for example, by the area under the curve of receiver operator characteristic and root-mean-square error in Table 1 below. FIG. 12 illustrates this improvement on a role-by-role basis. Each of the points represents a job and the diagonal line demarcates equal performance before and after the Bayesian model. All but two roles with more than 30 hiring manager decisions exhibit improved classification accuracy.

TABLE 1

| Model | ROCAUC | RMSE |
|---|---|---|
| Stage 1 | .718 | .316 |
| All Stage 2s | .770 | .309 |

Using the approach summarized above, role-by-role hiring preferences are predicted. By breaking modeling into multiple phases, role-by-role hiring preferences are inferred while updating the model inexpensively, quickly, and efficiently. Further, the approach scales to any number of roles with a linear increase in computational complexity, with each role-specific model fit on a dedicated computing core. FIG. 13 illustrates an example of a deep learning-derived natural language processing feature that serves as an input into the model.

An artificial neural network is a computational model inspired by the way biological neural networks in the human brain process information. Artificial neural networks have generated a great number of practical applications in machine learning research and industry, as a result of breakthroughs in speech recognition, computer vision, and text processing.

The basic unit of computation in a neural network is the neuron, which is often referred to as a node or unit. The neuron receives input from other node(s), or external source(s), and computes an output. Each input has an associated weight (w), which is assigned on the basis of its relative importance to other inputs. The node applies a function f to the weighted sum of its inputs.

For example, a neuron may have numerical inputs X1, X2 with weights w1, w2 respectively associated with those inputs. Additionally, there can be another input 1 with weight b, which is referred to as the bias that is associated with that input.

An output Y from the neuron is computed in accordance with the prescribed function f, which is non-linear and referred to as the activation function. The purpose of the activation function is to introduce non-linearity into the output of a neuron. This is because most real-world data contain non-linear relationships and neurons are used to learn these non-linearities.

The activation function (or non-linearity) takes a single number and performs a certain fixed mathematical operation on that number. Activation functions include the following:

Sigmoid—which takes a real-valued input and limits it to a range between 0 and 1 as represented by the following equation:

$$\sigma(x)=1/(1+\exp(-x));\tag{2}$$

tanh—which takes a real-valued input and limits it to the range [−1, 1] as represented by the following equation:

$$\tanh(x)=(\exp(x)-\exp(-x))/(\exp(x)+\exp(-x));\text{ and}\tag{3}$$

ReLU—which stands for rectified linear unit, and which takes a real-valued input and thresholds it at zero (i.e., replaces negative values with zero) as represented by the following equation:

$$f(x)=\max(0,x).\tag{4}$$

A feedforward neural network includes multiple neurons (nodes) arranged in layers. Nodes from adjacent layers have connections (or edges) between them. Each of these connections has associated weights.

A feedforward neural network can include three types of nodes. Input nodes provide information from the outside world to the network and are collectively referred to as the input layer. No computation is performed in any of the input nodes. Input nodes pass the information on to hidden nodes. Hidden nodes have no direct connection with the outside world. Hidden nodes perform computations and transfer information from the input nodes to the output nodes. A collection of hidden nodes forms a hidden layer. Output nodes are collectively referred to as the output layer and are responsible for computations and transferring information from the network to the outside world.

In a feedforward network, the information moves in only one direction: forward, from the input nodes, through the hidden nodes (if any), and to the output nodes. The most straightforward feedforward networks contain only fully connected layers, wherein any given node within the layer has incoming edges connecting it to all of the nodes in the preceding layer. There are no cycles or loops in the network, which is different from recurrent neural networks in which the connections between nodes form a cycle. A convolutional neural network (CNN) is a specialized class of deep neural network used in the field of deep learning. CNNs are neural networks that contain convolutional layers, often in addition to fully connected layers. Convolutional layers learn to identify location-invariant spatial features within the data fed into them. Stacking several of these convolutional layers enables a CNN to learn hierarchical patterns within data, wherein the CNN represents complex spatial patterns via the non-linear recombination of simpler spatial patterns.

A long short-term memory unit (LSTM) is an artificial recurrent neural network (RNN) architecture used in deep learning. Unlike standard feedforward neural networks, LSTMs include feedback connections. These feedback connections enable LSTMs to process sequences of data (such as speech or the price of a financial stock). For example, LSTMs are applicable to tasks such as unsegmented and connected handwriting recognition and speech recognition.

Max pooling is a sample-based discretization process. The objective is to down-sample an input representation, such as an image or hidden-layer output matrix, thereby reducing its dimensionality and allowing for assumptions to be made regarding features contained in the sub-regions of the input representation. This effectively reduces over-fitting by providing an abstracted form of the representation. In addition, max-pooling reduces computational cost by reducing the number of parameters to learn and provides basic translation invariance to the internal representation. Max pooling is typically performed by applying a max filter to non-overlapping subregions of the initial input representation.

Figure 14:
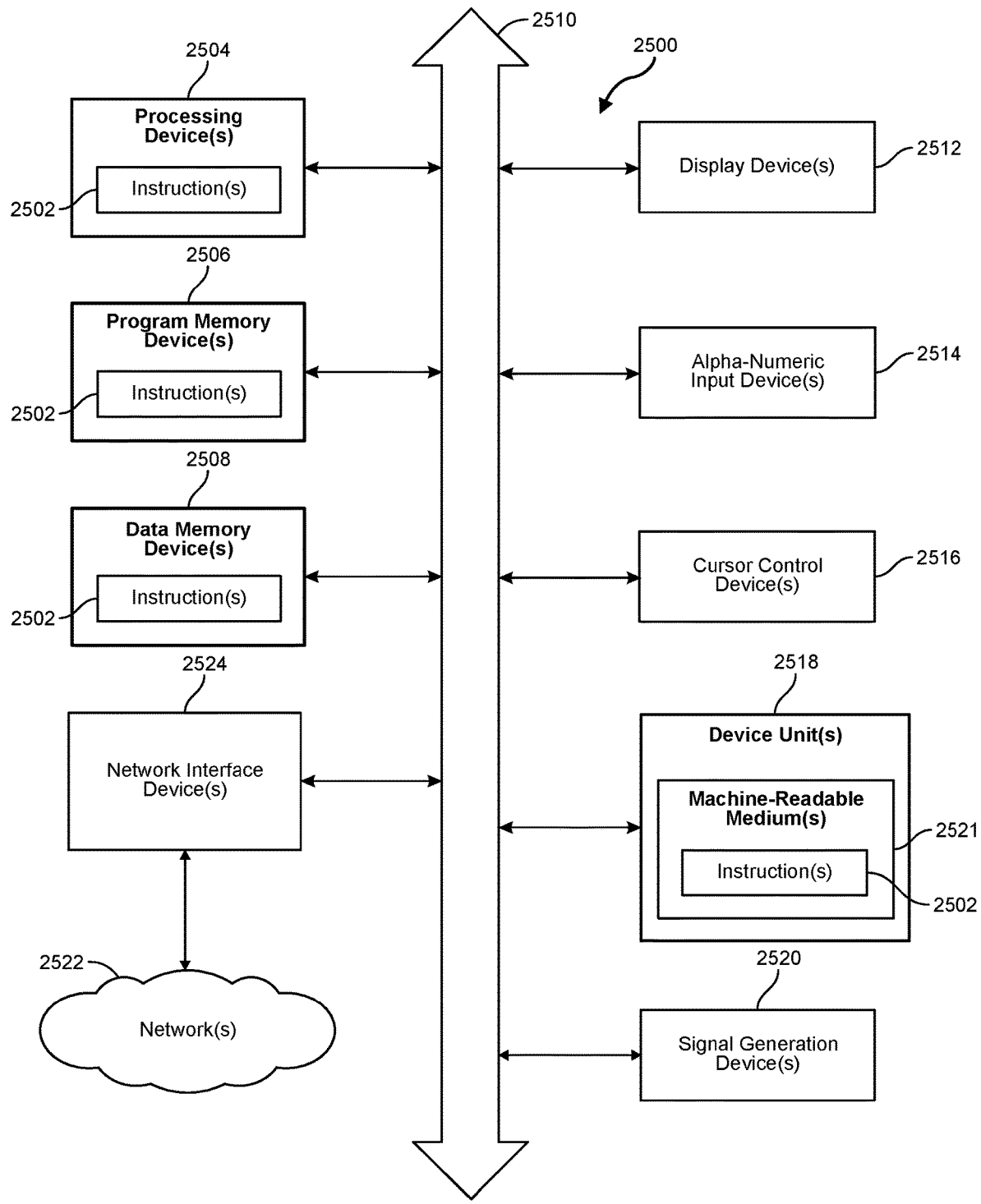
FIG. 14 shows a block diagram of at least a portion of an exemplary machine in the form of a computing system that performs methods according to one or more embodiments disclosed herein.

One or more embodiments disclosed herein, or a portion thereof, may make use of software running on a computer or workstation. By way of example, only and without limitation, FIG. 14 is a block diagram of an embodiment of a machine in the form of a computing system 2500, within which is a set of instructions 2502 that, when executed, cause the machine to perform any one or more of the methodologies according to embodiments of the invention. In one or more embodiments, the machine operates as a standalone device; in one or more other embodiments, the machine is connected (e.g., via a network 2522) to other machines. In a networked implementation, the machine operates in the capacity of a server or a client user machine in a server-client user network environment. Exemplary implementations of the machine as contemplated by embodiments of the invention include, but are not limited to, a server computer, client user computer, personal computer (PC), tablet PC, personal digital assistant (PDA), cellular telephone, mobile device, palmtop computer, laptop computer, desktop computer, communication device, personal trusted device, web appliance, network router, switch or bridge, or any machine capable of executing a set of instructions (sequential or otherwise) that specify actions to be taken by that machine.

The computing system 2500 includes a processing device(s) 2504 (e.g., a central processing unit (CPU), a graphics processing unit (GPU), or both), program memory device(s) 2506, and data memory device(s) 2508, which communicate with each other via a bus 2510. The computing system 2500 further includes display device(s) 2512 (e.g., liquid crystal display (LCD), flat panel, solid state display, or cathode ray tube (CRT)). The computing system 2500 includes alpha-numeric input device(s) 2514 (e.g., a keyboard), cursor control device(s) 2516 (e.g., a mouse), disk drive unit(s) 2518, signal generation device(s) 2520 (e.g., a speaker or remote control), and network interface device(s) 2524, operatively coupled together, and/or with other functional blocks, via bus 2510.

The disk drive unit(s) 2518 includes machine-readable medium(s) 2521, on which is stored one or more sets of instructions 2502 (e.g., software) embodying any one or more of the methodologies or functions herein, including those methods illustrated herein. The instructions 2502 may also reside, completely or at least partially, within the program memory device(s) 2506, the data memory device(s) 2508, and/or the processing device(s) 2504 during execution thereof by the computing system 2500. The program memory device(s) 2506 and the processing device(s) 2504 also constitute machine-readable media. Dedicated hardware implementations, such as but not limited to ASICs (application-specific integrated circuits), programmable logic arrays, and other hardware devices can likewise be constructed to implement methods described herein. Applications that include the apparatus and systems of various embodiments broadly comprise a variety of electronic and computer systems. Some embodiments implement functions in two or more specific interconnected hardware modules or devices with related control and data signals communicated between and through the modules, or as portions of an ASIC. Thus, the example computing system 2500 is applicable to software, firmware, and/or hardware implementations.

The term processing device as used herein is intended to include any processor, such as, for example, one that includes a CPU (central processing unit) and/or other forms of processing circuitry. Further, the term processing device may refer to more than one individual processor. The term memory is intended to include memory associated with a processor or CPU, such as, for example, RAM (random access memory), ROM (read-only memory), a fixed memory device (for example, hard drive), a removable memory device (for example, diskette), a flash memory and the like. In addition, the display device(s) 2512, alpha-numeric input device(s) 2514, cursor control device(s) 2516, signal generation device(s) 2520, etc., can be collectively referred to as an input/output interface, and is intended to include one or more mechanisms for inputting data to the processing device (s) 2504, and one or more mechanisms for providing results associated with the processing device(s). Input/output or I/O devices including, but not limited to, keyboards (e.g., alpha-numeric input device(s) 2514, display device(s) 2512, and the like) can be coupled to the system either directly (such as via bus 2510) or through intervening input/output controllers (omitted for clarity).

Figure 15:
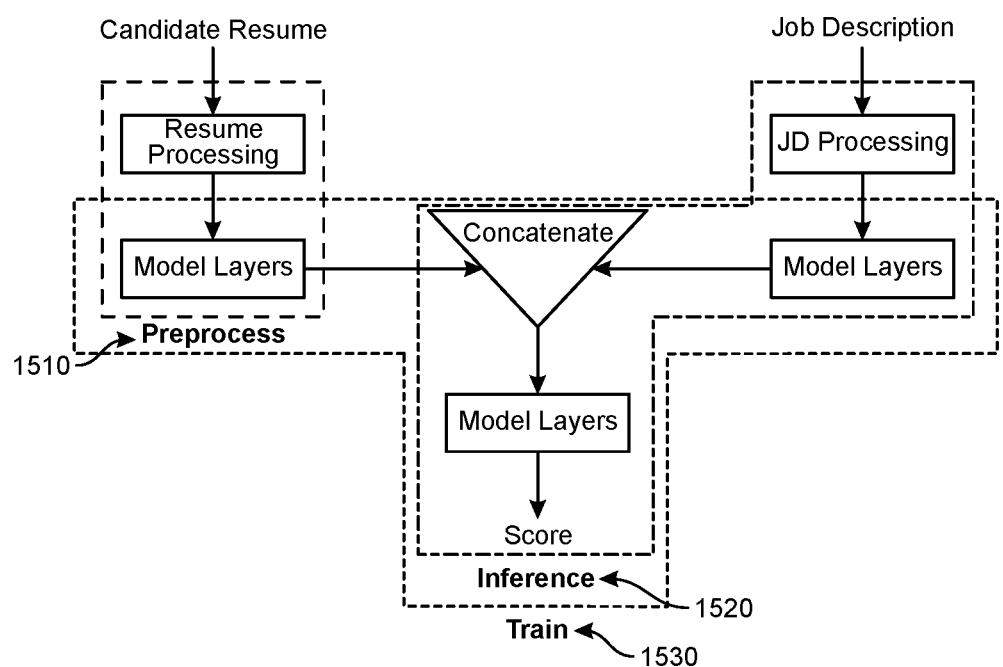
FIG. 15 shows a block diagram of separate preprocessing, training, and inference procedures.

As shown in FIG. 15, for efficient real-time inference in production systems, three separate procedures are used: Preprocess 1510, Train 1530, and Inference 1520. In the Preprocess 1510 procedure, a computationally expensive aspect of running the model—processing the natural language of resumes into numerical vectors representations and pre-training early layers of the neural network—is run asynchronously across all of the available candidates. The numerical vector for each resume is stored for the Train 1530 procedure and cached for the Inference procedure. The Train 1530 procedure, another computationally expensive aspect of running the model, is also run asynchronously to optimize the parameters of all of the layers of the neural network. Finally, the Inference 1520 procedure is run in real-time. During normal model use, users provide a single job description, which is computationally inexpensive to process into a numerical vector representation. Flowing the numerical representation of the single job description through all of the model layers is also computationally inexpensive, resulting in a sub-second generation of a role-suitability score for all available candidate profiles in the database.

In an integrated circuit implementation of one or more embodiments of the invention, multiple identical dies are typically fabricated in a repeated pattern on a surface of a semiconductor wafer. Each such die may include a device described herein and may include other structures and/or circuits. The individual dies are cut or diced from the wafer, then packaged as integrated circuits. One skilled in the art would know how to dice wafers and package die to produce integrated circuits. Any of the exemplary circuits or methods illustrated in the accompanying figures, or portions thereof, may be part of an integrated circuit. Integrated circuits so manufactured are considered part of this invention.

An integrated circuit in accordance with the embodiments of the present invention can be employed in essentially any application and/or electronic system in which buffers are utilized. Suitable systems for implementing one or more embodiments of the invention include, but are not limited to, personal computers, interface devices (e.g., interface networks, high-speed memory interfaces (e.g., DDR3, DDR4), etc.), data storage systems (e.g., RAID system), data servers, etc. Systems incorporating such integrated circuits are considered part of embodiments of the invention. Given the teachings provided herein, one of ordinary skill in the art will be able to contemplate other implementations and applications.

In accordance with various embodiments, the methods, functions or logic described herein is implemented as one or more software programs running on a computer processor. Dedicated hardware implementations including, but not limited to, application specific integrated circuits, programmable logic arrays and other hardware devices can likewise be constructed to implement the methods described herein. Further, alternative software implementations including, but not limited to, distributed processing or component/object distributed processing, parallel processing, or virtual machine processing can also be constructed to implement the methods, functions or logic described herein.

An example embodiment as shown in FIG. 14 contemplates a machine-readable medium or computer-readable medium containing instructions 2502, or that which receives and executes instructions 2502 from a propagated signal so that a device connected to a network environment, such as network 2522 can send or receive voice, video or data, and to communicate over the network 2522 using the instructions 2502. The instructions 2502 are further transmitted or received over the network 2522 via the network interface device(s) 2524. The machine-readable medium also contains a data structure for storing data useful in providing a functional relationship between the data and a machine or computer in an illustrative embodiment of the systems and methods herein.

While the machine-readable medium 2502 is shown in an example embodiment to be a single medium, the term machine-readable medium should be taken to include a single medium or multiple media (e.g., a centralized or distributed database, and/or associated caches and servers) that store the one or more sets of instructions. The term machine-readable medium shall also be taken to include any medium that is capable of storing, encoding, or carrying a set of instructions for execution by the machine and that cause the machine to perform any one or more of the methodologies of the embodiment. The term machine-readable medium shall accordingly be taken to include, but not be limited to: solid-state memory (e.g., solid-state drive (SSD), flash memory, etc.); read-only memory (ROM), or other non-volatile memory; random access memory (RAM), or other re-writable (volatile) memory; magneto-optical or optical medium, such as a disk or tape; and/or a digital file attachment to e-mail or other self-contained information archive or set of archives is considered a distribution medium equivalent to a tangible storage medium. Accordingly, the embodiment is considered to include any one or more of a tangible machine-readable medium or a tangible distribution medium, as listed herein and including art-recognized equivalents and successor media, in which the software implementations herein are stored.

It should also be noted that software, which implements the methods, functions and/or logic herein, are optionally stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the disclosure is considered to include a tangible storage medium or distribution medium as listed herein and other equivalents and successor media, in which the software implementations herein are stored.

Although the specification describes components and functions implemented in the embodiments with reference to particular standards and protocols, the embodiments are not limited to such standards and protocols.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments are utilized and derived therefrom, such that structural and logical substitutions and changes are made without departing from the scope of this disclosure. Figures are also merely representational and are not drawn to scale. Certain proportions thereof are exaggerated, while others are decreased. Accordingly, the specification and drawings are to be regarded in an illustrative rather than a restrictive sense.

Such embodiments are referred to herein, individually and/or collectively, by the term embodiment merely for convenience and without intending to voluntarily limit the scope of this application to any single embodiment or inventive concept if more than one is in fact shown. Thus, although specific embodiments have been illustrated and described herein, it should be appreciated that any arrangement calculated to achieve the same purpose are substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single embodiment. Thus, the following claims are hereby incorporated into the detailed description, with each claim standing on its own as a separate example embodiment.

The abstract is provided to comply with 37 C.F.R. § 1.72(b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single embodiment. Thus, the following claims are hereby incorporated into the Detailed Description, with each claim standing on its own as separately claimed subject matter.

Although specific example embodiments have been described, it will be evident that various modifications and changes are made to these embodiments without departing from the broader scope of the inventive subject matter described herein. Accordingly, the specification and drawings are to be regarded in an illustrative rather than a restrictive sense. The accompanying drawings that form a part hereof, show by way of illustration, and without limitation, specific embodiments in which the subject matter are practiced. The embodiments illustrated are described in sufficient detail to enable those skilled in the art to practice the teachings herein. Other embodiments are utilized and derived therefrom, such that structural and logical substitutions and changes are made without departing from the scope of this disclosure. This Detailed Description, therefore, is not to be taken in a limiting sense, and the scope of various embodiments is defined only by the appended claims, along with the full range of equivalents to which such claims are entitled.

Given the teachings provided herein, one of ordinary skill in the art will be able to contemplate other implementations and applications of the techniques of the disclosed embodiments. Although illustrative embodiments have been described herein with reference to the accompanying drawings, it is to be understood that these embodiments are not limited to the disclosed embodiments, and that various other changes and modifications are made therein by one skilled in the art without departing from the scope of the appended claims. Moreover, the techniques described above could be applied to other types of data and could be implemented via other tools instead of, or in addition to, those described and/or referenced herein.

What is claimed is:

1. An apparatus, the apparatus comprising:
a multicore system processing device;
a plurality of parallel multicore processing devices;
an interface device, the interface device providing connection to the multicore system processing device;
a storage device, the storage device storing training data comprising at least one positive example and at least one negative example, the at least one positive example representing a candidate who would be invited to an interview, the at least one negative example representing a candidate without at least one of a relevant skill and an experience who would not be invited to an interview, the at least one positive example and the at least one negative example being used by the plurality of parallel multicore processing devices to train a deep learning model, the deep learning model being used by the multicore system processing device to predict fitness of a specific candidate for a role; and
an interface bus, the interface bus operably coupling the multicore system processing device, the plurality of parallel multicore processing devices, the interface device, and the storage device,
wherein
the training data is generated by stripping a most recent role from a resume associated with a candidate who has a plurality of instances of work experience listed in a listing of professional history,
the at least one positive example is generated by concatenating the most recent role with a remainder of preceding work experience,
the at least one negative example is generated by concatenating a random job description from a randomly selected and different resume with the remainder of preceding work experience based on an unlikelihood that the candidate will be a good match for the random job description,
at least one indicative pronoun is excluded from a process of extracting relevant information-rich natural language, thereby limiting capacity associated with the deep learning model to develop bias against a demographic group, and the deep learning model comprises a plurality of parallel deep learning natural language model paths comprising sigmoid output neurons at an output stage of at least one portion of the deep learning model with rectified linear unit neurons used between internal layers within the deep learning model.

2. The apparatus, as defined by claim 1, wherein fitness is represented as a value between zero and one.

3. The apparatus, as defined by claim 2, wherein the value between zero and one represents a probability that a human recruiter would invite the specific candidate for an interview for the role.

4. The apparatus, as defined by claim 1, wherein the apparatus is further configured to perform a statistical test to confirm that measures to limit bias are effective.

5. The apparatus, as defined by claim 4, wherein parsed resume language and a job description associated with a job for which the specific candidate is applying are tokenized, converted into an integer, and processed by a word embedding model.

6. The apparatus, as defined by claim 1, wherein a scoring process applied by the deep learning model utilizes parallel processing of a plurality of recent work experiences associated with the specific candidate.

7. The apparatus, as defined by claim 6, wherein the deep learning model utilizes parallel processing by processing the resume associated with the specific candidate and extracting relevant information-rich natural language.

8. The apparatus, as defined by claim 1, wherein a capacity of the deep learning model to develop bias against a particular gender is limited.

9. The apparatus, as defined by claim 1, wherein demographic and personally identifiable information are excluded from extracting relevant information-rich natural language.

10. The apparatus, as defined by claim 1, wherein a capacity of the deep learning model to develop bias against a particular race is limited.

11. A method, the method comprising:
a plurality of parallel multicore processing devices, within a multicore system processing device, training a deep learning model based on training data that is stored within a storage device and that comprises at least one positive example and at least one negative example, the at least one positive example representing a candidate who would be invited to an interview and the at least one negative example representing a candidate without at least one of a relevant skill and an experience who would not be invited to an interview; and applying the deep learning model to score a level of fitness associated with a specific candidate for a role, wherein an interface bus operably couples the multicore system processing device, the plurality of parallel multicore processing devices, the storage device, and an interface device that provides connection to the multicore system processing device, the training data is generated by stripping a most recent role from a resume associated with a candidate who has a plurality of instances of work experience listed in a listing of professional history, the at least one positive example is generated by concatenating the most recent role with a remainder of preceding work experience, the at least one negative example is generated by concatenating a random job description from a randomly selected and different resume with the remainder of preceding work experience based on an unlikelihood that the candidate will be a good match for the random job description, at least one indicative pronoun is excluded from a process of extracting relevant information-rich natural language, thereby limiting capacity associated with the deep learning model to develop bias against a demographic group, and the deep learning model comprises a plurality of deep learning natural language model paths comprising sigmoid output neurons at an output stage of at least one portion of the deep learning model with rectified linear unit neurons used between internal layers within the deep learning model.

12. The method of claim 11, wherein fitness is represented as a value between zero and one.

13. The method of claim 12, wherein the value between zero and one represents a probability that a human recruiter would invite the specific candidate for an interview for the role.

14. The method of claim 11, further comprising performing a statistical test to confirm that measures to limit bias are effective.

15. The method of claim 14, wherein parsed resume language and a job description associated with a job for which the specific candidate is applying are tokenized, converted into an integer, and processed by a word embedding model.

16. The method of claim 11, wherein a scoring process applied by the deep learning model utilizes parallel processing of a plurality of recent work experiences associated with the specific candidate.

17. The method of claim 16, wherein the deep learning model utilizes parallel processing by processing the resume associated with the specific candidate and extracting relevant information-rich natural language.

18. The method of claim 11, wherein a capacity of the deep learning model to develop bias against a particular gender is limited.

19. The method of claim 11, wherein demographic and personally identifiable information are excluded from extracting relevant information-rich natural language.

20. A non-transitory computer-readable storage medium storing computer-executable instructions that, when executed, cause performance of a method comprising:
a plurality of parallel multicore processing devices, within a multicore system processing device, training a deep learning model based on training data that is stored within a storage device and that comprises at least one positive example and at least one negative example, the at least one positive example representing a candidate who would be invited to an interview and the at least one negative examples representing a candidate without at least one of a relevant skill and an experience who would not be invited to an interview; and applying the deep learning model to score a level of fitness associated with a specific candidate for a role, wherein an interface bus operably couples the multicore system processing device, the plurality of parallel multicore processing devices, the storage device, and an interface device that provides connection to the multicore system processing device, the training data is generated by stripping a most recent role from a resume associated with a candidate who has a plurality of instances of work experience listed in a listing of professional history, the at least one positive example is generated by concatenating the most recent role with a remainder of preceding work experience, the at least one negative example is generated by concatenating a random job description from a randomly selected and different resume with the remainder of preceding work experience based on an unlikelihood that the candidate will be a good match for the random job description, at least one indicative pronoun is excluded from a process of extracting relevant information-rich natural language, thereby limiting capacity associated with the deep learning model to develop bias against a demographic group, and the deep learning model comprises a plurality of parallel deep learning natural language model paths comprising sigmoid output neurons at an output stage of at least one portion of the deep learning model with rectified linear unit neurons used between internal layers within the deep learning model.

* * * * *